United States Patent Office 3,671,265
Patented June 20, 1972

3,671,265
RAISIN COLORING PROCESS
Donald L. Maxwell and Philip E. Nyberg, Minneapolis, Minn., assignors to General Mills, Inc.
No Drawing. Filed Apr. 13, 1970, Ser. No. 28,027
Int. Cl. A23l 1/27
U.S. Cl. 99—104                                      6 Claims

ABSTRACT OF THE DISCLOSURE

A process for coloring raisins involving dissolving food colorings in ethyl alcohols, exposing the raisins to the solution and then manipulating the reaction to produce the color desired.

This invention relates to coloring raisins. More particularly, it relates to coloring raisins with a variety of bright colors for decorative purposes.

Naturally occurring colors of raisins range from light yellow to the common dark brown. This limited variation in color restricts the use of raisins as decorating aids in table settings, cakes or cookie toppings, fruit cocktails and the like.

We have now found that surfaces of raisins can be readily impregnated with food colorings to produce a colored raisin. The food coloring is fixed in the skin and is resistant to removal by water or abrasion.

In general the present invention comprises dissolving food coloring in ethyl alcohol, immersing the raisins in the alcohol solution, removing the raisins from the alcoholic solution, draining them and drying to remove the residual alcohol.

Colorings useful in this invention are generally food colorings which are at least slightly soluble in ethyl alcohol. Raisins have only a limited permeability toward ethyl alcohol. Therefore, the food coloring in an ethyl alcohol solution is deposited on the surface of the raisin without being significantly transferred into the interior of the fruit. Upon evaporating the alcohol, the color is fixed on the surface. The raisin has a natural color of its own, which in the case of bleached raisins is a light yellow or amber. The coloring from the alcohol solution can be made to interact with the natural coloring of raisin to produce a third color. This is done by depositing the color from the alcoholic solution onto the raisin, removing the raisin from alcoholic solution, then washing the raisins in water to permit interaction, and then washing with alcohol to stop the interaction. Among the colors useful in this invention are FD & C Red #3, sodium salt of 2′,4′,5′,7′-tetraiodo fluorescin and FD & C Blue #1, 3,3′-dioxo-[$\Delta^{2,2'}$-biindoline]-5,5′-disulfonic acid disodium salt. In Example II a method of making a green colored raisin using FD & C Blue #1 and interacting it with a natural color of the raisin is illustrated.

With colors which are basically water soluble and have only limited solubility in alcohol, forming the alcoholic solution is accomplished by dissolving or wetting the coloring in water and diluting the mixture with alcohol. The water content of the final solution should not be greater than about 15% by volume of the solution. High water concentrations cause the penetration of both the ethyl alcohol and the coloring into the interior of the raisin. The penetration of the alcohol creates a residual flavor which is not eliminated upon drying. Preferably the water content is from about 5% to about 10% by volume of the solution. In the preferred procedure, the food coloring is present in the solution in amounts of from about 0.005% to 0.5% by weight of the solution.

The raisins can be soaked in the alcoholic coloring solution at room temperature until the desired intensity is obtained. To obtain brilliant colors, hours of soaking at room temperature may be required. Good results have been obtained using a period of from about five to sixteen hours. The absorption of the color onto the raisin surface is accelerated by heating the alcoholic solution. Colors can be absorbed in a matter of minutes at temperatures near the boiling point of the solution. In the preferred embodiment of the invention the raisins are soaked for a period of from two to ten minutes in a boiling solution.

Ethyl alcohol soluble flavorings can be impregnated into the raisin along with the food coloring. This is done by merely adding the flavoring to the alcoholic-food coloring solution. As shown below in the examples, flavoring such as cinnamon and lemon flavorings can easily be introduced into the raisins.

The following examples illustrate procedures of impregnating food colorings into the raisin. As is readily apparent, many variations in the colorings, temperatures and manipulative operations can be made.

EXAMPLE I

Three-tenths gram of FD & C Red #3, sodium salt of 2′,4′,5′,7′-tetraiodo fluorescin, was wetted in five milliliters of water. Two hundred ninety five milliliters of 95% ethyl alcohol and 2 ml. of concentrated cinnamon flavor were added to the mixture. Into this solution 250 grams of bleached raisins were added. The raisin containing alcoholic solution was then heated on a steam bath for six minutes. A reflux condensor was used to return the alcohol vapors to the solution. The solution was at boiling temperature for 3½ minutes. The raisins were then removed from the solution, drained on a sieve and thoroughly washed with 80 ml. of 95% ethyl alcohol. The washing was repeated once. After the final draining, the raisins were spread out and air dried for a period of 40 hours at room temperature.

The raisins obtained by this procedure were a bright, attractive red and had a cinnamon flavor note.

EXAMPLE II

Nine-tenths gram FD & C Blue #1, 3,3′-dioxo-[$\Delta^{2,2'}$-biindoline]-5,5′-disulfonic acid disodium salt, was wetted with 5 ml. water and dissolved in 295 ml. of ethyl alcohol as in Example I. Two and one-half milliliters of lemon essential oil was added in place of the concentrated cinnamon flavor. The soaking procedure was the same as in Example I. After initially draining the raisins of the alcoholic solution, the raisins were washed with 80 ml. of water then with 80 ml. of ethyl alcohol. After washing the raisins were spread out and air dried at room temperature for a period of 40 hours.

The raisins obtained were a brilliant, attractive green with a lemon flavor note.

The use of water for washing caused an interaction of the blue coloring with the natural yellow color of the raisins to produce the final green color. When the washing is done entirely with alcohol, a bright blue is obtained.

The embodiments of the invention in which an exclusive property or privilege is claimed are defined as follows:

1. A process for coloring raisins comprising soaking raisins in solution comprised of food coloring and ethyl alcohol until sufficient food coloring has deposited on the surface of the raisins to produce the desired color intensity, said ethyl alcoholic food coloring solution containing not more than about 15% water by volume of said solution, removing the raisins from the ethyl alcoholic food coloring solution, and drying the residual alcohol from the surface of said raisins.

2. The process of claim 1 wherein said ethyl alcoholic food coloring solution is heated during the soak period.

3. The process of claim 1 wherein said alcoholic solution is prepared by wetting the food coloring in water and diluting said water-food coloring solution with ethyl alcohol in an amount that the water present in the final solution does not exceed about 15% by volume of the final solution.

4. The process of claim 1 wherein said food coloring is sodium salt of 2',4',5',7'-tetraiodo fluorescin.

5. The process of claim 1 wherein said food coloring is 3,3'-dioxo-[$\Delta^{2,2'}$-biindoline]-5,5'-disulfonic acid disodium salt.

6. The process of claim 1 wherein said raisins after removal from said ethyl alcohol solution and before drying are washed with water and then ethyl alcohol.

References Cited

UNITED STATES PATENTS 1,909,860   5/1933   Harvey _____ 99—148 X

OTHER REFERENCES

Furia, T. E.: Ed. Handbook of Food Additives, Chemical Rubber Co., Cleveland, Ohio, 1968, pp. 30–31.

RAYMOND N. JONES, Primary Examiner

J. M. HUNTER, Assistant Examiner

U.S. Cl. X.R.

99—148